United States Patent [19]
Sifniades et al.

[11] 3,917,684

[45] Nov. 4, 1975

[54] RECOVERY OF LYSINE VALUES BY REMOVAL OF AMMONIUM CHLORIDE FROM LYSINE CONTAINING LIQUORS

[75] Inventors: Stylianos Sifniades, Madison; Allen Abraham Tunick, Boonton, both of N.J.

[73] Assignee: Allied Chemical Corporation, New York, N.Y.

[22] Filed: July 30, 1973

[21] Appl. No.: 383,738

[52] U.S. Cl.............................................. 260/534 L
[51] Int. Cl.²................. C07C 99/08; C07C 101/24
[58] Field of Search................................ 260/534 C

[56] References Cited
UNITED STATES PATENTS

| | | | |
|---|---|---|---|
| 2,564,649 | 8/1951 | Rogers | 260/534 |
| 2,579,283 | 12/1951 | Vines | 260/534 |
| 2,859,244 | 11/1958 | White | 260/534 |

FOREIGN PATENTS OR APPLICATIONS

| | | | |
|---|---|---|---|
| 45-34568 | 6/1970 | Japan | 260/534 |

*Primary Examiner*—James A. Patten
*Attorney, Agent, or Firm*—Arthur J. Plantamura

[57] ABSTRACT

Lysine.2HCl is converted to lysine.HCl by neutralization and crystallization with ammonia in an organic solvent. After removal of the precipitated lysine·HCl, the solvent mixture containing $NH_4Cl$, some lysine·HCl and organic solvent is fractionated to recycle the solvent and then acidified with hydrochloric acid to salt out a major portion of the $NH_4Cl$. The remaining solution is then combined with a lysine precursor to produce lysine·2HCl. This novel method ensures virtually complete recovery of lysine from the processing system.

4 Claims, 1 Drawing Figure

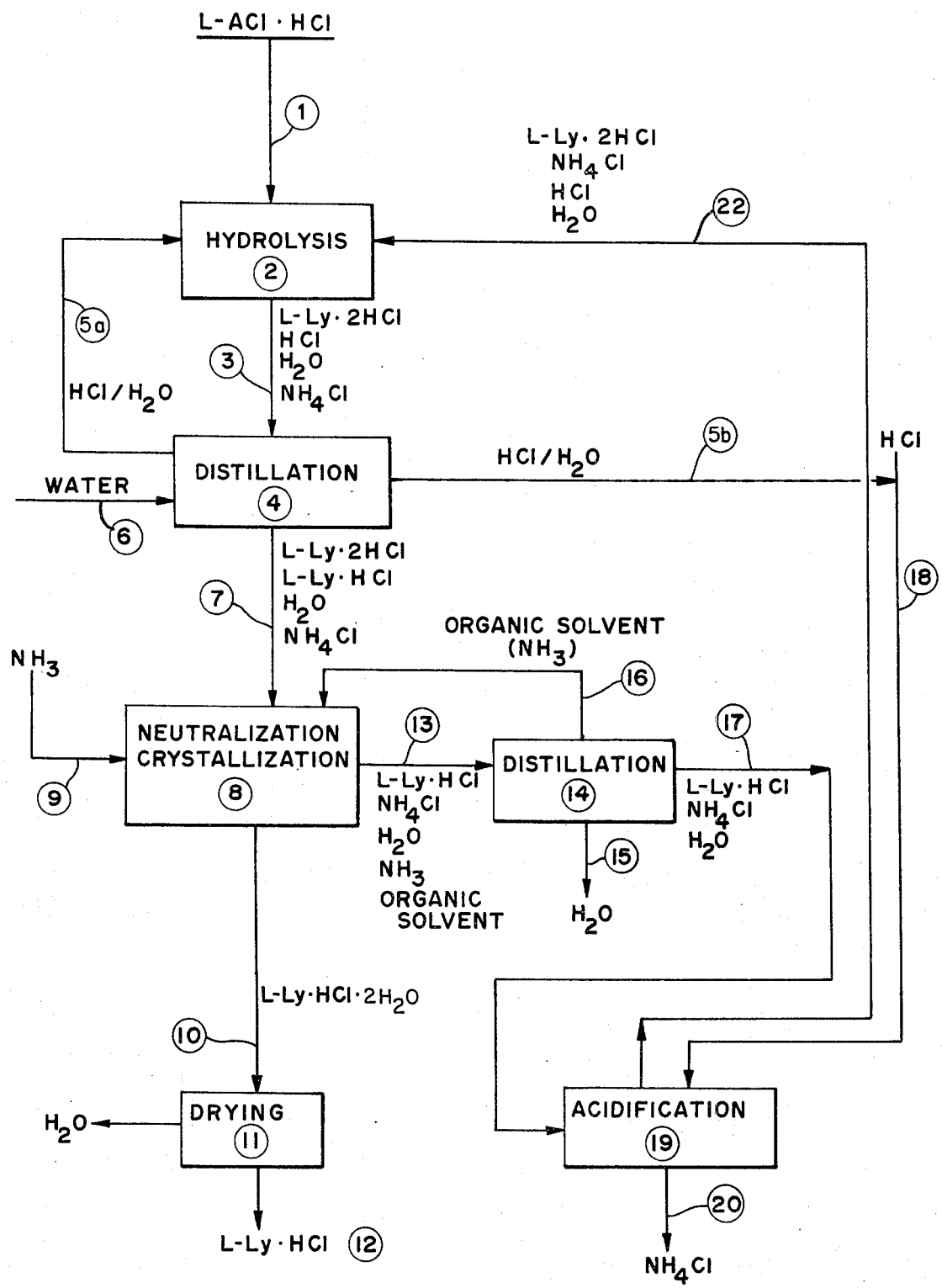

RECOVERY OF LYSINE VALUES BY REMOVAL OF AMMONIUM CHLORIDE FROM LYSINE CONTAINING LIQUORS

BACKGROUND OF THE INVENTION

I. Field of the Invention

The present invention is related to a method for converting a solution of lysine·2HCl, to crystalline lysine·HCl by neutralization and crystallization with ammonia in an organic solvent wherein substantially all the lysine is recovered from the system.

L-lysine is one of the nutritionally essential amino acids. Its widespread use as a dietary supplement, preferably in the form of its monohydrochloride salt, has unfortunately been inhibited by the difficulty of synthetically producing it economically and efficiently. It is known to produce lysine by hydrolysis of certain precursors with hydrochloric acid. However, it has been found that in order to obtain a good rate of hydrolysis, it is necessary to use at least two mols hydrochloric acid per mol precursor. As a result, the lysine produced is present in the reaction mixture as the dihydrochloride salt, rather than as the desired monohydrochloride salt.

II. Description of the Prior Art

A variety of methods have been suggested for removal of the extra hydrochloric acid. In accordance with one method, as disclosed in U.S. Pat. No. 2,579,283, lysine·2HCl which is produced by hydrolysis of a polymeric hydantoin is converted to lysine monohydrochloride by passing an aqueous solution of the dihydrochloride over an anion exchange resin. The resin is then regenerated to yield a chloride solution; however, there is no way to recover the processing agents, e.g. ammonium hydroxide, sodium hydroxide and other reagents which were employed to regenerate the resin thus rendering the system uneconomical. When it became known to use L-aminocaprolactam as a satisfactory lysine precursor, the use of an ion exchange resin was expanded in U.S. Pat. No. 3,576,859 to include the recovery and reutilization of the processing agents. In this latter patent, the lysine dihydrochloride, produced from the hydrolysis of α-amino-ε-caprolactam, is passed through an anion exchanger to remove HCl. Subsequently, the HCl bound to the resin is removed by formation of a salt with additional α-amino-ε-caprolactam; the salt is then recycled into the hydrolysis step. Both of these patents have the disadvantage of necessitating bulky, costly and time-consuming anion exchange resin equipment. Moreover, the lysine monohydrochloride thus formed is obtained as a relatively dilute aqueous solution which must be further processed to recover the lysine monohydrochloride in the desired crystalline form.

In another method disclosed in U.S. Pat. No. 2,876,218, lysine dihydrochloride is first isolated by hydrolyzing α-amino-ε-caprolactam and subjecting the hydrolysis mixture, which contains lysine dihydrochloride and hydrochloric acid, to a vacuum distillation to eliminate excess acid and water. Subsequently the lysine dihydrochloride is converted to lysine monohydrochloride by use of pyridine in an organic solvent, preferably in an alcoholic medium. Similar techniques are used to convert lysine ·2HCl in U.S. Pat. Nos. 2,564,649 and 2,859,244. In the procedure of these patents, it is difficult to recover all the lysine product from the reaction medium since some of the lysine·HCl remains in the solution. This problem is particularly acute when a second compound is present which may also crystallize and contaminate the desired product. In the production of lysine, it is desired that lysine·HCl crystallizes out while the weak base salt (pyridinium chloride of NH$_4$Cl) must stay in solution. In order to facilitate production of pure lysine·HCl in such a system it is necessary that the crystallization not be carried to completion so that some of the lysine·HCl remains in solution together with all the weak base salt. Specifically to illustrate with reference to Example 1 in U.S. Pat. No. 2,859,244 a loss of 5% lysine·HCl which is the amount retained in solution is suffered in the water/ethanol solvent system. Additionally, if these disclosed processes are employed, a relatively large volume of organic solvent is required in order to effect as complete a crystallization of lysine as possible since recycling of the solvent containing some lysine products would cause a build up of undesirable by-products in the crystallization system.

There is accordingly a need for an economical, efficient and relatively fast method for converting lysine dihydrochloride to lysine monohydrochloride.

There is also a need for a method of directly producing crystalline lysine monohydrochloride with little or no loss of reaction product in the solvent system.

SUMMARY OF THE INVENTION

We have found that lysine dihydrochloride, particularly aqueous solutions of lysine dihydrochloride, can be converted to crystalline lysine monohydrochloride by neutralization and crystallization with ammonia in a water miscible, volatile organic solvent. After removal of the precipitated lysine monohydrochloride, the solvent mixture containing NH$_4$Cl, some lysine·HCl, organic solvent and water can be fractionated to recycle the organic solvent and then acidified with HCl to salt out a major portion of the NH$_4$Cl contaminant. The reaction of the present invention thus proceeds as follows:

1. 100 Lysine·2HCl + 100 NH$_3$ 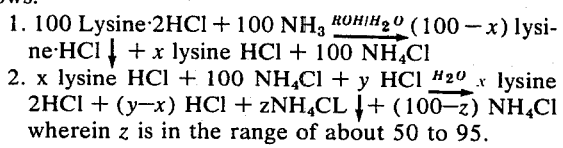 (100 −x) lysine·HCl ↓ + x lysine HCl + 100 NH$_4$Cl
2. x lysine HCl + 100 NH$_4$Cl + y HCl $\xrightarrow{H_2O}$ x lysine 2HCl + (y−x) HCl + zNH$_4$CL ↓ + (100−z) NH$_4$Cl wherein z is in the range of about 50 to 95.

It is to be noted that since the solubility of lysine 2HCl in water is greater than the solubility of the NH$_4$Cl in water, this salting out procedure provides selective separation from the system of the Cl ions in the form of the NH$_4$Cl crystalline coproduct thus insuring that all the lysine product will remain in the reaction stream with the hydrochloric acid. Moreover, the hydrochloric acid which is used to salt out the NH$_4$Cl and which remains in the processing stream after removal of the NH$_4$Cl is then further utilized in the hydrolysis operation to form additional lysine·2HCl. Since this hydrochloric acid stream also contains any lysine remaining in the system, this insures recovery of substantially all the lysine·HCl remaining in solution while ensuring no deleterious buildup of NH$_4$Cl within the system.

The recycling of the processing materials containing some L-lysine·HCl in solution comprises an important advantage of the invention; in the absence thereof, it would be necessary to use a large volume of organic solvent in order to optimize precipitation of lysine·HCl. Moreover, even when large quantities of solvent were employed, some valuable lysine·HCl would be lost in the system.

Thus, the primary advantages to the utilization of the present conversion technique is that there is little or no loss of the desired lysine product in the system and that less organic solvent is required for the crystallization since the solvents and all other processing materials can be either further utilized or recovered in the form of a crystalline co-product to provide an efficient continuous operation.

It is therefore an object of the present invention to provide a simple and economical process for converting lysine dihydrochloride to lysine monohydrochloride.

It is also an object of the present invention to provide a method for recovering relatively pure lysine monohydrochloride from lysine dihydrochloride.

It is another object of the present invention to provide a method for recovering crystalline precipitated lysine monohydrochloride directly from the conversion step.

It is a further object of the present invention to provide a method for the continuous operation of the system for producing lysine monohydrochloride wherein substantially all the lysine is recovered from the processing system and all other materials are either removed from the system or further utilized in a downstream operation.

The primary advantage to the utilization of the present conversion technique is that the processing agents need not be separated or otherwise removed from the system. In accordance with the invention, relatively pure lysine monohydrochloride is precipitated in crystalline form out of the system and the remaining aqueous-organic solution is easily fractionated to separate out the organic solvent which is recycled to the crystallization step. The remaining aqueous solution is then acidified with hydrochloric acid to salt out the $NH_4Cl$ after which the solution containing primarily hydrochloric acid is recycled to the hydrolysis step where it is combined with $\alpha$-amino-$\epsilon$-caprolactam to produce additional lysine dihydrochloride.

Thus, in accordance with the present invention, a relatively rapid, economical and efficient method for conversion of lysine·2HCl to lysine·HCl is provided in which all processing agents are recovered and reutilized in subsequent operations, thereby insuring complete recovery of the valuable lysine product.

BRIEF DESCRIPTION OF THE DRAWING

The novel conversion and recycling process of the present invention will be described in connection with the drawing which is a typical flow diagram showing a preferred embodiment of the continuous operation of the invention.

DESCRIPTION OF THE PREFERRED EMBODIMENTS

The lysine dihydrochloride useful in the conversion technique of the present invention may be prepared by any method which would not lead to the presence of undesirable by-product formation within the reaction system. Suitable synthetic methods include hydrolysis of either polymeric hydantoins or of $\alpha$-amino-$\epsilon$-caprolactam.

In accordance with the embodiment shown in the attached figure, L-$\alpha$-amino-$\epsilon$-caprolactam hydrochloride salt (L-ACl·HCl) 1 is hydrolyzed at 2 in an aqueous solution with more than 2 moles, preferably 2.5–4.0 moles, hydrochloric acid per mole lactam. We have found that the reaction proceeds well under pressure of about 5 to 100 psig. If desired, the hydrolysis may also be carried out at atmospheric pressures under reflux conditions. In either case, the temperature should be from the boiling point of the solution to around 160°, preferably about 140°C. The reaction is allowed to proceed for a period of 1–4 hours, until the lactam has been completely hydrolyzed at 3 to L-lysine·2HCl as may be determined by thin layer chromatography and/or measurement of the specific optical rotation.

The hydrochloric acid in the hydrolysis mixture 3 which is not bound to the lysine can be removed in a variety of ways such as by distillation 4 at about 95° to 120°C as disclosed in U.S. Pat. No. 3,576,859. Sufficient hydrochloric acid is removed at 5a and 5b so that the hydrolysis mixture 7 which is to be subsequently converted to the monohydrochloride will, at this point in processing, contain at least some lysine monohydrochloride, preferably about 0.05–0.3 moles monohydrochloride per mole dihydrochloride in addition to the lysine dihydrochloride. This is preferably effected by continuously replacing at least part of the aqueous hydrochloric acid with water 6 which is thereafter removed during distillation. The aqueous hydrochloric acid mixture which is removed may be recycled to the hydrolysis step 2 as shown by 5a, however to achieve optimum use of the processing agents, the mixture is preferably directed as by 5b to a subsequent acidification step. If the distillation step is not employed, the excess free HCl may be removed at other stages during the conversion process using conventional techniques such as ion exchange resins, etc. However, for the purpose of simplicity, efficiency, economics and ease of operation, distillation prior to neutralization-crystallization is most satisfactory.

The neutralization/crystallization step at 8 is carried out by adding at least one molar equivalent of ammonia per equivalent of L-lysine·2HCl and a water miscible volatile organic solvent to the residue stream 7 resulting from the distillation 4. The ammonia is preferably added in its gaseous form, although anhydrous liquid ammonia may also be used if the reaction is carried out at elevated pressures. Alternatively a solution of anhydrous $NH_3$ in the organic solvent may be used. Aqueous solutions of ammonia may also be used, however since this would result in an increase of the reaction volume, necessitating subsequent removal of excess water, anhydrous ammonia is preferred. The organic solvent should be miscible with water and preferably have a boiling point lower than water or be capable of forming an azeotrope with water at temperatures less than 100°C. The preferred solvent would be alcoholic in nature but certain ether media such as glyme could also be employed. For reasons of economy and availability, the lower alkyl alcohols, such as methanol and ethanol, are preferred.

The reaction is carried out under any convenient temperature and pressure conditions. The preferred temperature range is from about 20° to 75°C. Lower temperatures may be used but no advantage ensues. At temperatures of about 60°C., more concentrated solutions may be used to give higher rates of crystallization.

The resulting lysine·HCl crystals are in the form of the dihydrate, L-lysine·HCl·2H$_2$O 10. The product is preferably washed with fresh aqueous organic solvent and dried 11 at temperatures of approximately 120°C to give crystals of L-lysine·HCl 12.

The mother liquors 13, remaining after removal of the crystalline L-lysine·HCl and containing some L-lysine·HCl, $NH_4Cl$, water, organic solvent, and excess ammonia, are fractionated; e.g. by distillation 14. This distillation removes the organic solvent and excess ammonia 16 which are recovered and recycled to the neutralization/crystallization step 8. Some water 15 containing small quantities of ammonia is also removed from the system.

The concentrated aqueous residue 17, remaining after removal of the solvent and ammonia, is acidified 19 by addition of HCl 18 thereby causing ammonium chloride to crystallize out by common ion effect. In order to effect this salting out, it is necessary that the hydrochloric acid used be at least 4N, preferably about 8N in order to provide sufficient concentration of chloride ions. The HCl may be added directly into the system at this point, however, it is preferred that at least part of the HCl used in this acidification step is obtained from the $HCl/H_2O$ stream 5b which was removed from the hydrolysis stream by distillation step 4. Crystalline ammonium chloride 20 is separated by filtration or other physical means and the remaining liquor 22, containing HCl and small amounts of L-lysine·2HCl, and $NH_4Cl$ in solution is recycled to the hydrolysis step 2 where it is combined with L-aminocaprolactam hydrochloride 1 to produce more L-lysine·2HCl 3. It is noted that little or no additional HCl acid need be added to effect hydrolysis of the aminocaprolactam since in a preferred embodiment, the hydrochloric acid obtained from distillation 4 and employed at 18 to effect salting out of the $NH_4Cl$ is further utilized in this hydrolysis operation.

While the preferred embodiments have been directed to the conversion of L-lysine·2HCl, it is readily apparent that the invention may be similarly applied to the conversion also of D-lysine·2HCl or D, L-lysine·2HCl.

The following examples are provided solely for the purposes of illustration and the scope of the invention is not intended to be limited thereto.

EXAMPLE 1

Hydrolysis 165 g. L-ACl·HCl (1 mole) were introduced into a 1 liter autoclave together with a recycle solution containing 26 g (0.12 mole) L-lysine·2HCl, 21g (0.40 mole) $NH_4Cl$, $H_2O$ and 2.0 molar equivalents hydrochloric acid. The overall volume of the reaction mixture was about 500 ml. The mixture was heated at 142°C for 80 minutes, after which all the L-ACl·HCl had been converted to L-lysine·2HCl. No racemization occurred.

Distillation 1

The reaction mixture was subjected to distillation at atmospheric pressure. During distillation, the amount of water that distilled off together with HCl was partly replaced by periodic additions of fresh water. The 44 g HCl (1.2 mol), which distilled, was recycled downstream to the acidification step.

Neutralization/Crystallization

To the residue containing 201 g (0.92 mole) L-lysine·2HCl, 36.9 g. (0.2 mole) L-lysine·HCl, $NH_4Cl$ and about 300 ml water was added about 1.0 mole anhydrous ammonia in 1100 ml methanol at room temperature to cause precipitation, over a period of 30 minutes, of the L-lysine·HCl·$2H_2O$ These lysine crystals were then filtered and washed with fresh aqueous methanol and air dried at 120°C. The yield of L-lysine·HCl was 182 g. (1.0 mole) an amount which represented about 89% of the L-lysine·HCl present.

Distillation 2

The combined mother liquors and wash liquors were fractionated by distillation. The methanol and excess ammonia were recycled to the neutralization/crystallization step. The resulting mixture was concentrated to remove some of the water and the small amount of remaining ammonia.

Acidification

The residue containing the remaining 11% (22 gm) L-lysine·HCl plus 72 g. (1.35 mole) $NH_4Cl$ and water was acidified at about 30°C. by the addition of 28g hydrochloric acid combined with the 43g hydrochloric acid from the first distillation operation to supply a total of 71 g (2 moles) HCl in sufficient water to make a final volume of the reaction mixture equal to about 350 ml. This resulted in salting out $NH_4Cl$. The crystals were washed with a small amount of concentrated hydrochloric acid and the combined liquors, containing 25g (0.11 mole) L-lysine·2HCl, 21 g (0.4 mole) $NH_4Cl$ and water were returned to the autoclave and treated as described in the above hydrolysis step to produce additional L-lysine·2HCl. The overall L-lysine·HCl yield was 99%.

EXAMPLE 2

The procedure of Example 1 was repeated with the exception that 800 ml ethanol were employed in the neutralization/crystallization step. The use of this reduced volume of solvent is possible because of the lower solubility of lysine·HCl in aqueous ethanol. The overall L-lysine HCl yield was again 99%.

EXAMPLE 3

171 g 5-δ-aminobutyl hydantoin (1 mole) was introduced into the autoclave with a recycle solution containing 26 gm (0.12 mole) L-lysine·2HCl, 21 gm (0.40 mole) $NH_4Cl$, $H_2O$ and 148 g (4 mole) hydrochloric acid. The mixture was hydrolized for 3 to 4 hours with constant boiling at about 180°C and removal of $CO_2$ by venting until all the hydantoin had been converted to L-lysine·2HCl. After distillation, the dihydrochloride was then converted to the monohydrochloride using ammonia in methanol in a manner similar to that described in Example 1. Overall yield of lysine monohydrochloride was 97%.

We claim:

1. In a method of converting lysine dihydrochloride in aqueous solution to crystalline lysine monohydrochloride wherein lysine monohydrochloride is crystallized from the aqueous solution by adding ammonia and water miscible volatile organic solvent, the improvement comprising:
   a. fractionating the resulting aqueous medium after separation of the crystalline lysine monohydrochloride to separate therefrom the organic solvent and substantially all the ammonia;
   b. acidifying the aqueous medium remaining after step (a) with hydrochloric acid to precipitate $NH_4Cl$;
   c. removing the precipitated $NH_4Cl$; and
   d. combining the solution remaining after step (c), and consisting essentially of hydrochloric acid, with a lysine precursor which yields lysine after acidic hydrolysis and with sufficient HCl to provide at least 2 moles HCl per mole of said precursor, thereby producing lysine dihydrochloride.

2. The method of claim 1 wherein the hydrochloric acid of step (b) is added in the form of a 4 to 12 N solution.

3. The method of claim 1 wherein the hydrochloric acid in step (b) is added as an 8N solution.

4. In a method for the production of crystalline lysine monohydrochloride wherein a lysine precursor is hydrolyzed with hydrochloric acid to form a lysine dihydrochloride solution which is thereafter neutralized with ammonia in the presence of a water miscible volatile organic solvent, and the precipitated lysine monohydrochloride thus formed is removed, the improvement comprising:

a. fractionating the solution remaining after removal of the precipitated lysine monohydrochloride to separate the organic solvent and excess ammonia from a solution containing L-lysine·HCl and $NH_4Cl$;

b. recycling the organic solvent and ammonia from step a to the neutralized lysine dihydrochloride solution;

c. acidifying the L-lysine containing solution remaining after step (a) with a solution of at least 4NHCl to salt out $NH_4Cl$;

d. removing the precipitated $NH_4Cl$; and e. utilizing the solution remaining after step (d) and containing HCl and lysine dihydrochloride to effect hydrolysis of the lysine precursor.

* * * * *